March 16, 1926.  E. LEHMANN  1,577,325
METHOD OF COMPENSATING DIFFERENCES OF DENSITIES IN CINEMATOGRAPHIC PRINTS
Filed June 27, 1924
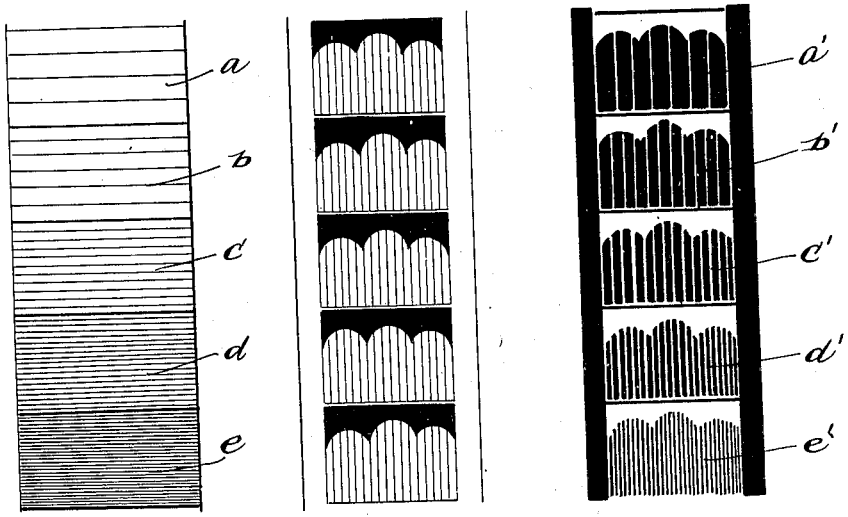
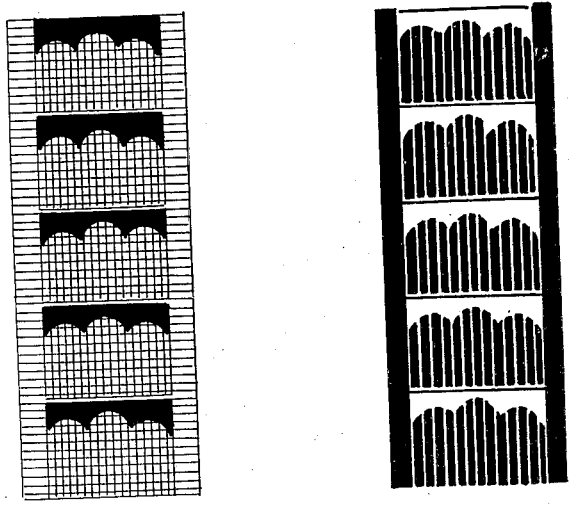
Inventor
Erich Lehmann
By B. Singer
Attorney Patented Mar. 16, 1926.

1,577,325

UNITED STATES PATENT OFFICE.

ERICH LEHMANN, OF BERLIN-CHARLOTTENBURG, GERMANY.

METHOD OF COMPENSATING DIFFERENCES OF DENSITIES IN CINEMATOGRAPHIC PRINTS.

Application filed June 27, 1924. Serial No. 722,864.

*To all whom it may concern:*

Be it known that I, ERICH LEHMANN, professor in the Institute of Technology, Berlin-Charlottenburg, a citizen of Germany, residing at 6 Carmerstrasse, in the city of Berlin-Charlottenburg, Germany, have invented certain new and useful Improvements in Methods of Compensating Differences of Densities in Cinematographic Prints, of which the following is a specification.

This invention has reference to a process of compensating or balancing the differences of copying densities of cinematographic film ribbons. In order to avoid the necessity of changing the degree of illumination in the successive printing of cinematographic picture ribbons it has already been suggested by Liesegang, Handbuch der praktischen Kinematographie 1912, page 356, published by Ed. Liesegang, Leipzig, to compensate the differences of density of the several scenes by differently strong staining with light absorbing dyes. In view thereof, my invention is intended to devise means of determining the necessary strength of this staining, and to accordingly effect the staining of the film.

With this object in view a plurality of transparent coatings or layers which have been progressively and increasingly stained is combined into a scale, and at the rear thereof test-prints are produced of each negative with the same illumination and are uniformly developed. By selecting the particular test copies of equal densities or possessing the desired conditions of transparency and ascertaining the corresponding degrees of the scale, which may be facilitated in the usual manner by the simultaneous copying or printing of index marks or the like, the particular intensity is obtained with which the final staining of the several negatives has to be effected throughout their extent. The said negatives may then be combined, and can then be printed by machinery in succession without changing the degree of illumination.

Referring to the annexed drawing Fig. 1 is a scale composed of 5 progressively and increasingly stained pieces of transparent layer, where the strength of staining is indicated by the density of horizontal hatching. Fig. 2 is a part of the negative scene, to be stained, in which the different degrees of blackening are schematically indicated by vertical hatching and solid black. When making a test print with this negative behind the scale (Fig. 1) a print is obtained as shown in Fig. 3. The different degrees of blackening of this print are indicated by the different densities of vertical hatching. According to the strength of staining of the scale in Fig. 1 increasing from $a$ to $e$, the density of the test print in Fig. 3 is decreasing from $a'$ to $e'$. Assuming that picture $c'$ of the test print is the most satisfactory, the whole negative scene is stained with the same amount of dye, as was used for the staining of part $c$ of the scale, thus obtaining a stained negative scene as shown in Fig. 4, in which horizontal hatching indicates the degree of staining and the vertical hatching shows the original degree of blackening of the negative. With this stained negative a print results as shown in Fig. 5 with satisfactory blackening, as indicated by vertical hatching.

The invention admits of various modifications and changes within the broad principles thereof herein before outlined, and without deviating from the spirit of the invention as pointed out in the appended claim.

I claim:—

The method of determining the intensity of staining of cinematographic picture ribbons required for the compensation of different printing densities in the printing by machinery, which consists in making test-prints behind a scale of graduated progressively and increasingly stained, transparent layers and then staining the entire negative to a degree corresponding to that of the layer, behind which the most satisfactory test print was produced.

In testimony whereof I affix my signature.

PROF. DR. ERICH LEHMANN.